March 14, 1944.　　　E. KOMENDA　　　2,344,092
VEHICLE BODY
Filed July 6, 1939　　　6 Sheets-Sheet 2
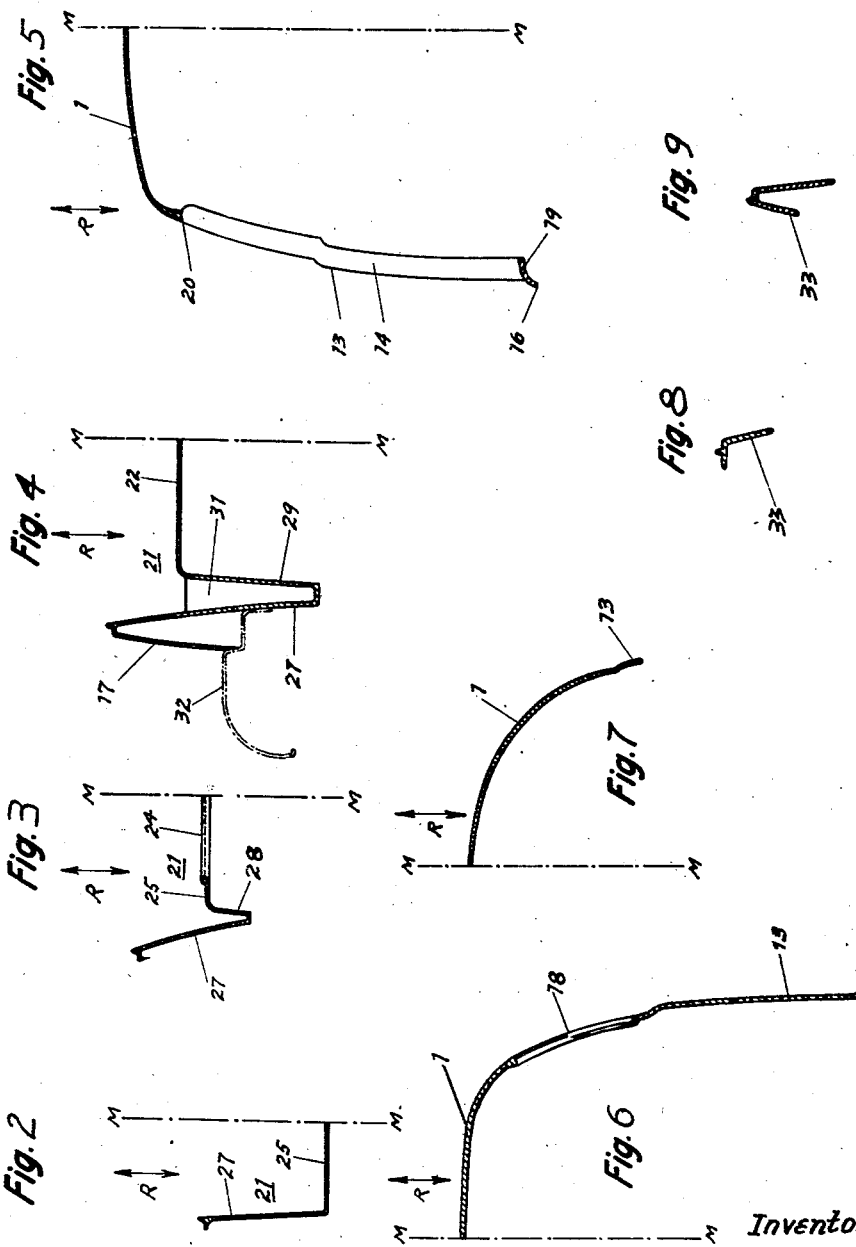

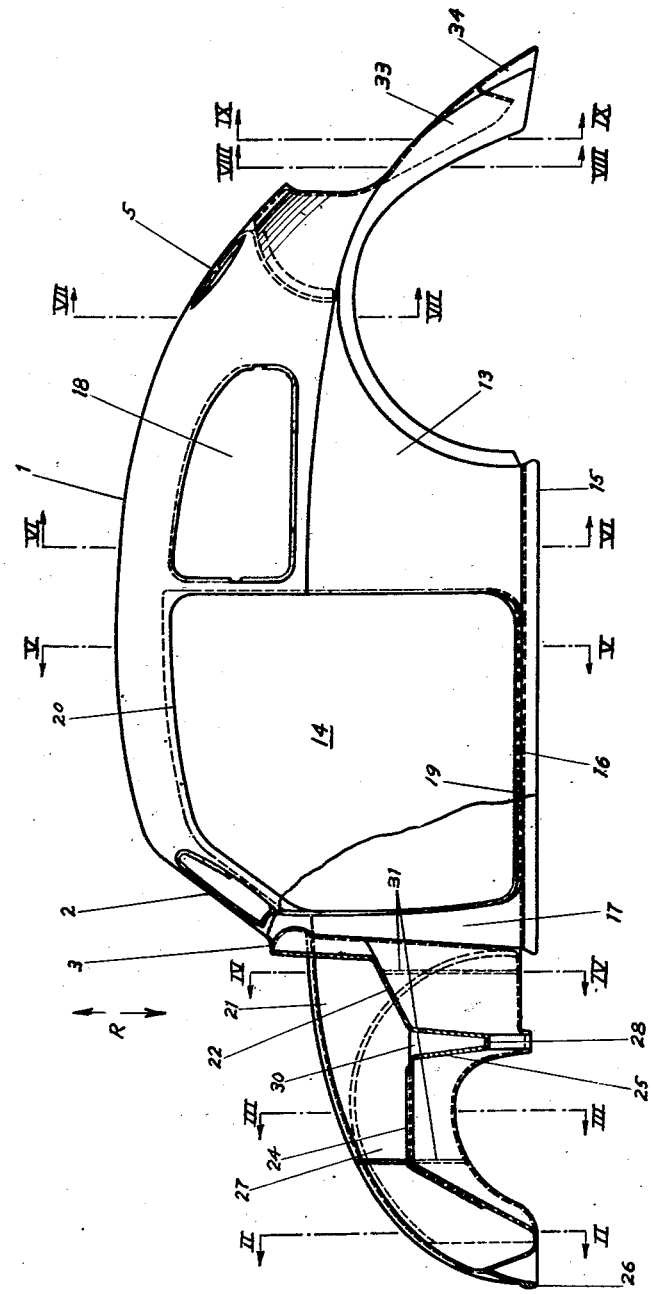

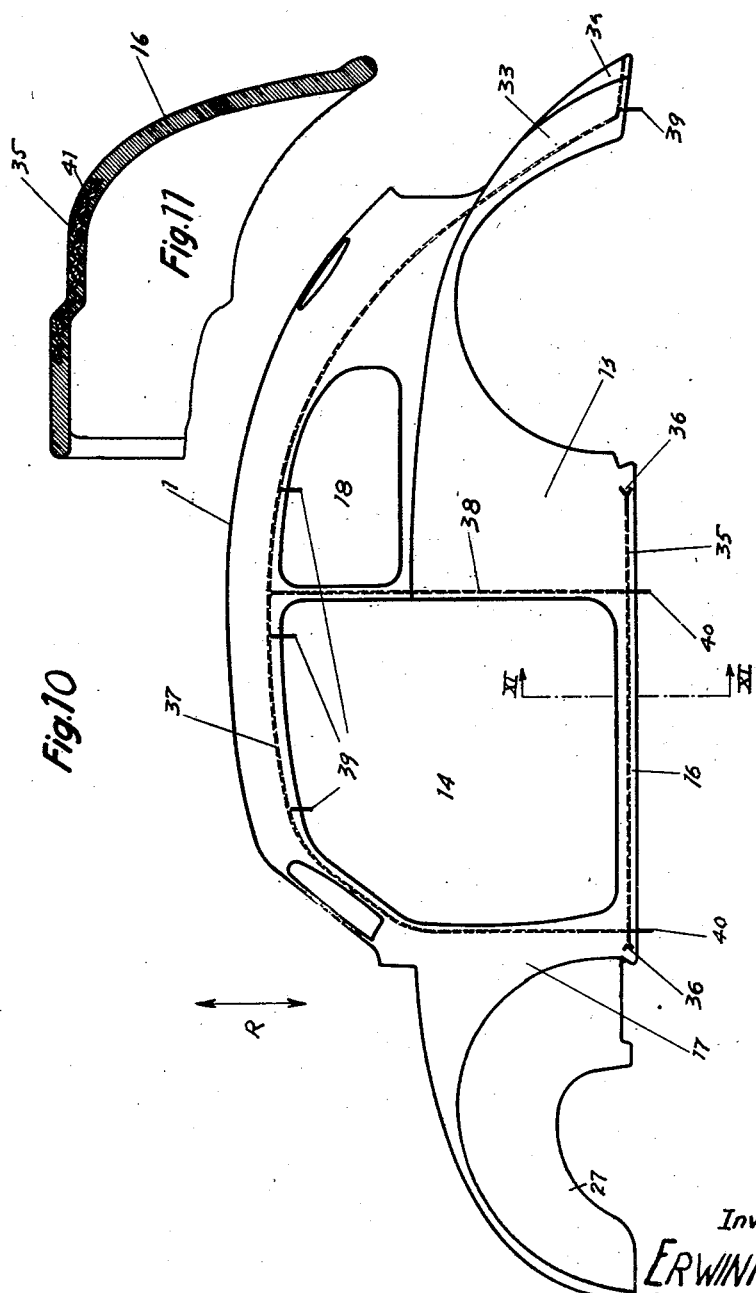

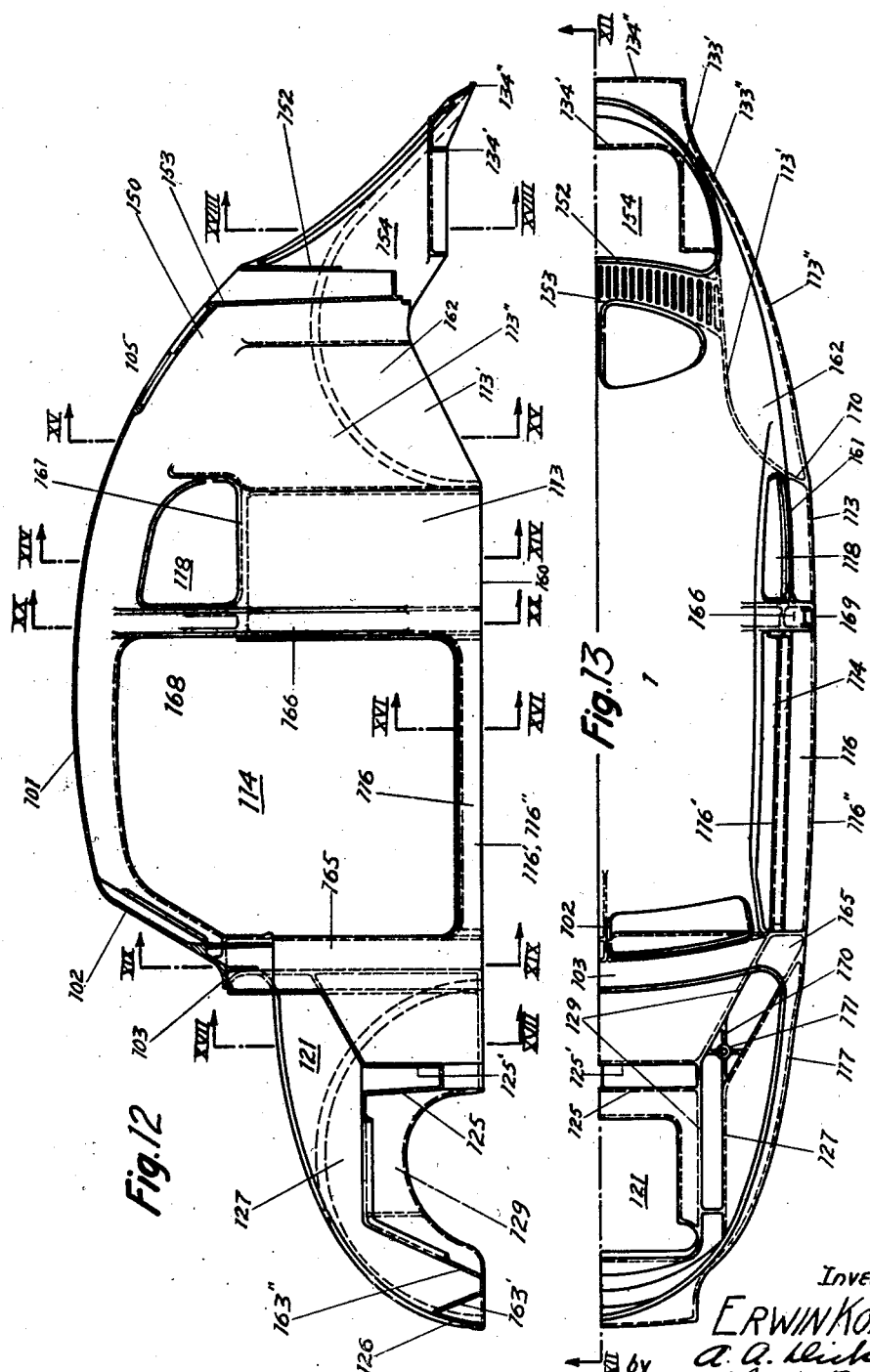

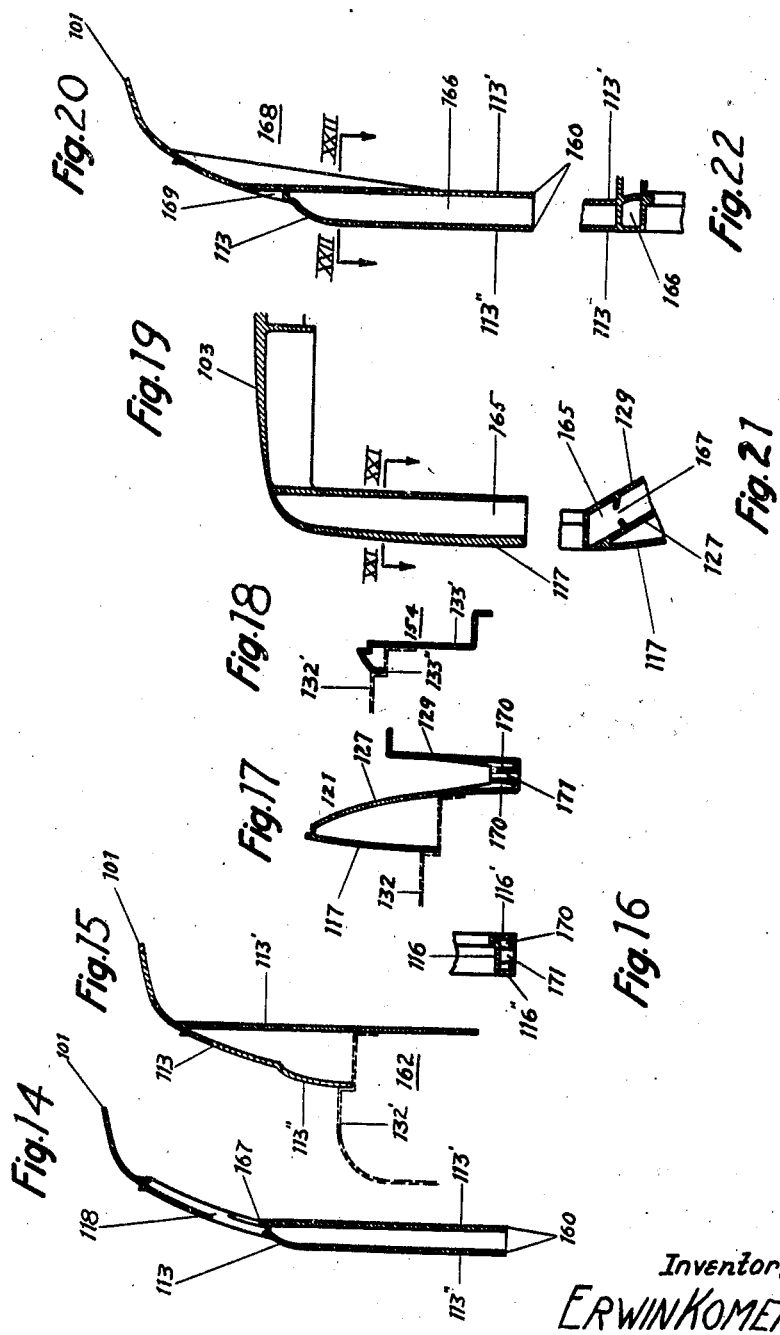

March 14, 1944.    E. KOMENDA    2,344,092
VEHICLE BODY
Filed July 6, 1939    6 Sheets-Sheet 6
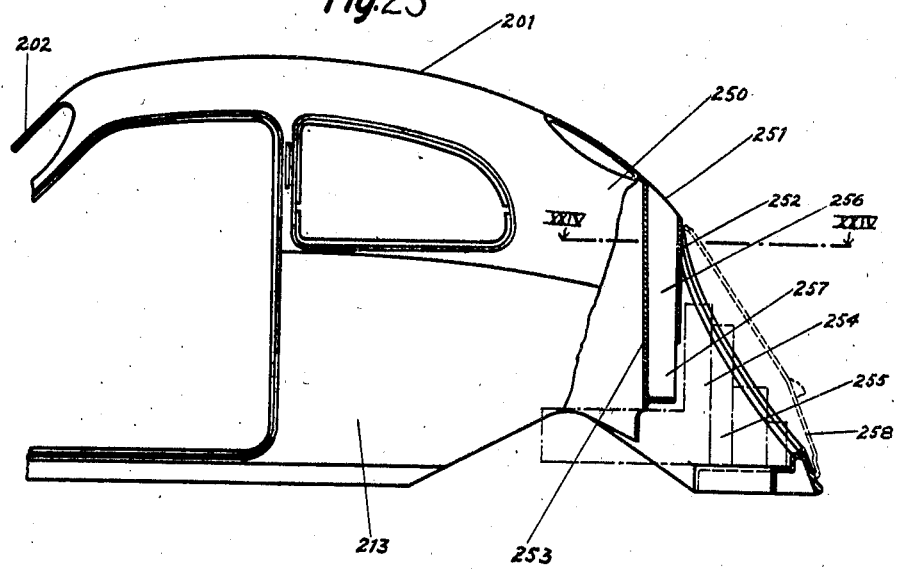
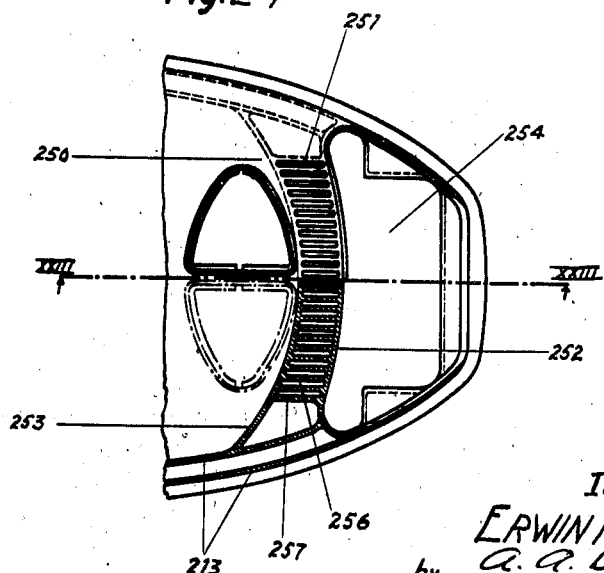
Inventor:
ERWIN KOMENDA
by
Attorneys Patented Mar. 14, 1944

2,344,092

UNITED STATES PATENT OFFICE 2,344,092

VEHICLE BODY

Erwin Komenda, Korntal-Stuttgart, Germany; vested in the Alien Property Custodian Application July 6, 1939, Serial No. 283,011
In Germany August 25, 1938

18 Claims. (Cl. 296—31)

This invention relates to a vehicle body, and more particularly to such a body formed of artificial material.

An object of this invention is the formation of a vehicle body encompassing all the main body part, which is made as an integral piece of artificial material.

Another object of this invention is the formation of an integral vehicle body of artificial material, encompassing all the main body parts, which can be formed on a simple vertically acting press.

Still another object of this invention is to provide a vehicle body of artificial material, wherein the roof and side walls form an integral bell-shaped structure having cut-out portions for the doors and windows.

A further object of this invention is the provision of a vehicle body of artificial material, wherein the roof and side walls are integrally formed with the cowl and other parts to enclose a motor space, baggage space, etc.

A still further object of this invention lies in the provision of a metallic strengthening frame embedded in a vehicle body of artificial material during the process of forming said body as an integral structure.

An additional object of this invention is the provision of a vehicle body of artificial material formed with integral louvers for the guiding of air to the engine and/or passenger space of the vehicle.

A more comprehensive object of this invention lies in the provision of a vehicle body fulfilling the objects above stated, which is strong, rigid, and at the same time easily, simply and inexpensively manufactured.

Other objects will become apparent from the following description taken in connection with the attached drawings showing several illustrative embodiments of the invention, and wherein:

Fig. 1 is a side elevation, partially in cross-section of an integral vehicle body formed in accordance with the principles of this invention;

Fig. 2 is half a cross-sectional view relative to the central longitudinal plane of the vehicle, taken along the line II—II of Fig. 1;

Fig. 3 is half a cross-sectional view relative to the central longitudinal plane of the vehicle taken along the line III—III of Fig. 1;

Fig. 4 is half a cross-sectional view relative to the central longitudinal plane of the vehicle, taken along the line IV—IV of Fig. 1;

Fig. 5 is half a cross-sectional view relative to the central longitudinal plane of the vehicle taken along the line V—V of Fig. 1;

Fig. 6 is half a cross-sectional view relative to the central longitudinal plane of the vehicle taken along the line VI—VI of Fig. 1;

Fig. 7 is half a cross-sectional view relative to the central longitudinal plane of the vehicle taken along the line VII—VII of Fig. 1;

Fig. 8 is a cross-sectional view taken along the line VIII—VIII of Fig. 1;

Fig. 9 is a cross-sectional view taken along the line IX—IX of Fig. 1;

Fig. 10 is a side elevation of a vehicle body similar to Fig. 1, illustrating the addition of a strengthening frame;

Fig. 11 is a cross-sectional view on an enlarged scale along the line XI—XI of Fig. 10;

Fig. 12 is a side elevation, partially in cross-section along the line XII—XII of Fig. 13, of a modified type of vehicle body formed in accordance with the principles of this invention;

Fig. 13 is half a top plan view of the vehicle body illustrated in Fig. 12;

Fig. 14 is a cross-sectional view along the line XIV—XIV of Fig. 12;

Fig. 15 is a cross-sectional view along the line XV—XV of Fig. 12;

Fig. 16 is a cross-sectional view along the line XVI—XVI of Fig. 12;

Fig. 17 is a cross-sectional view along the line XVII—XVII of Fig. 12;

Fig. 18 is a cross-sectional view along the line XVIII—XVIII of Fig. 12;

Fig. 19 is a cross-sectional view along the line XIX—XIX of Fig. 12;

Fig. 20 is a cross-sectional view along the line XX—XX of Fig. 12;

Fig. 21 is a cross-sectional view along the line XXI—XXI of Fig. 19;

Fig. 22 is a cross-sectional view along the line XXII—XXII of Fig. 20;

Fig. 23 is a side elevation, partially in cross-section along the line XXIII—XXIII of Fig. 24 illustrating the details of a modified rear-end construction; and Fig. 24 is a combined top plan and cross-sectional view taken along the line XXIV—XXIV of Fig. 23.

Fig. 1 clearly illustrates the appearance of a preferred type of integral body made from artificial material in accordance with the principles of this invention, showing the vehicle roof 1 being formed integrally with the windshield frame 2 and cowl 3. In addition to the windshield opening, the roof 1 is also preferably formed with an integral rear window opening 5. As illustrated in Fig. 1, and also in Figs. 5, 6 and 7, the side walls 13 of the vehicle are also formed as an outwardly downwardly curved integral extension of the vehicle roof 1. In the forward part of the main body portion the side walls are cut through to form a door opening 14. The lower edge 15 of the side walls 13 is preferably extended forwardly below the door opening 14 to form a door sill 16 which, in turn, is integrally connected with the side panel 17 of the cowl 3.

In order to provide a side window opening, the side wall 13 is provided with a cut-out portion 18. It will be here noted, particularly from a study of Fig. 6, which is half a cross-sectional view along the line VI—VI, taken from the central longitudinal plane of the vehicle, M—M, that due to the curved configuration of the side wall 13 the vertical projection of the upper and lower edges of the cut-out portions do not overlap, so that it is possible to cut through the side wall by means of a simple press having vertically acting dies moving in the direction indicated by the arrows R. In a similar manner, the door opening 14 can be cut through by vertically acting dies since the respective lower and upper edges 19 and 20 of the door opening do not overlap in the vertical direction. It will accordingly be seen, therefore, that the entire main portion vehicle body can be made upon a two-part, vertically acting press even though this body is at the same time provided with windshield, window and door openings.

The main vehicle body may be integrally forwardly extended to form a suitable compartment such as the baggage space 21. This can be accomplished, while still retaining the advantages of a two-part, vertically acting press by extending the cowl downwardly and forwardly as a transverse wall 22 to form a connecting point for the vehicle body with the floor (not shown). This wall may then extend upwardly and forwardly and be provided with an opening 24 in the portion 25 for the purpose of receiving a fuel tank (also not illustrated). From this part the wall will extend all the way to the extreme front of the vehicle, 26. The space 21 is preferably closed at its sides by integral longitudinal walls 27, which, at the same time, form inner wheel housing panels. Where the transverse wall is at the level of the lower edge of the side wall 27, this may be directly connected as shown in Fig. 2. Where, however, the side wall extends below the transverse wall, a different mode of interconnection is preferably used. As shown in Fig. 3, in this case the side wall 27 is interconnected with the transverse wall 25 by means of an intermediate wall part intersecting the bottom of the side panel 27 in a substantially V-shaped cross-section. Similarly, in Fig. 4, the transverse wall 22 is connected with the side panel 27 by means of the intermediate member 29. This arrangement still permits the formation of this relatively complicated construction by means of simple two-part vertically acting die. As will be seen in Fig. 4, a similar type of connection is also utilized between the side portion 17 of the cowl 3 at its point of interconnection with the side panel 27. Suitable strengthening means may be provided to rigidly interconnect the double-wall structures above described. As will be seen seen in Fig. 1, the two parts 22 and 25 of the forwardly extending transverse wall may be strengthened by means of rib 30, while the double wall formed by portions 27 and 29 may be interconnected by strengthening ribs 31. Additionally, the lower edge of the side portion 17 may be rigidly interconnected with the side panel 27 by the fender 32.

Just as the forward parts of the body are made integral with the main body portion, the rear end of the vehicle which is preferably intended for enclosing the engine, may also be made integral. As illustrated in Figs. 1, 8 and 9, the side wall 13 may extend rearwardly to form the wall 33 of the rear extension, which may then be integrally interconnected by transverse wall 34.

In some cases it is desirable to strengthen the vehicle body by means of inserted metallic reinforcement members. A preferred arrangement for doing this is illustrated in Figs. 10 and 11 showing, for example, a metallic reinforcing insert 35 positioned along the lower edge of the side wall 13 and extending particularly through the door sill 16 of the cut-out portion 14. The reinforcing member 35 is illustrated as being provided with extensions 36 for securely anchoring it in the artificial material. In a preferred arrangement, the reinforcing member 35 is preferably rigidly interconnected by welding or other suitable means with further reinforcing members such as 37 extending upwardly along the forward edge of the cut-out portion, through the side members of the windshield frame, along the upper edge of the cut-out portion and rearwardly along the edge of the roof 1 to the extreme end of the vehicle, and another vertically extending member 38 for strengthening the rear edge of the cut-out portion and the forward edge of the window opening 18. It is contemplated that similar rigid frames will be provided on each side of the vehicle and the two frames will then be rigidly united as a single framework by suitable similar transverse reinforcing members (not shown).

In the formation of the vehicle body, the reinforcing frame 35, 37 and 38 is preferably held in place in the lower half of the two-part press by means of suitable guiding members such as projecting pins 39 and 40, and the body is then integrally moulded about the frame.

In order to secure a strong rigid bond between the reinforcing members and the surrounding artificial material, the reinforcing members may have a corrugated shape as is best seen in Fig. 11, and may also be formed with openings 41 into which the artificial material may flow to form connecting columns passing through the reinforcing frame.

A modified type of vehicle body based upon the principles of the construction previously described, is illustrated in Figs. 12 to 22, inclusive, wherein the side walls and other body parts are formed double-walled to increase the rigidity of the structure in many ways, and to improve both the interior and exterior appearance of the vehicle. The roof 101 with its integral windshield frame 102, cowl 103, and rear window opening 105, is substantially the same as heretofore described. Likewise, the side walls 113 are provided with cutout portions 114 forming the side door openings in the vehicle body. In this case, however, the side walls 113 are forked to form a pair of depending walls 113' and 113", thus forming a double-wall structure. By this arrangement, there is not only a gain in strength and appearance by the use of these double-walls, but additionally these walls can be formed where desired into longitudinal body strengthening beams and vertical body-strengthening columns.

In the first place, as best seen in Figs. 12, 14 and 15, the side wall 113 is extended into walls 113' and 113" forming a longitudinal supporting beam open at the bottom which extends under the door opening 114 and there forms the door sill 116 consisting of the two longitudinal members 116' and 116". Fig. 14 illustrates clearly the manner in which the forked side wall construction in the vicinity of the side window 118 extends upwardly to the lower sill 161 of the window 118. Fig. 15, to the contrary, shows that in the rear portion of the vehicle body, the inner portion 113' of the side wall is curved to form an inner panel for the wheel housing 162, whereas the outer portion 113" of the side wall extends only partially downwardly. At this point the bottom of the wall 113" may be interconnected with the inner portion 113' by means of the fender 132'. It is to be noted in this connection, that the wheel housing 162 is spaced from the window opening 118 by a distance which is at least equal to the thickness of the double-wall portion 113'. This difference exists in the vertical direction of the body as is best seen in Fig. 13, and makes possible the formation of both of these openings by a press having only vertically acting dies. If the construction of the vehicle body is such that the two openings 118 and 162 overlap in their vertical projections, it will be necessary to form the overlapped portion of one of the openings by means of special dies.

The side walls adjacent the door opening 114 are preferably formed as columns 165 and 166 having a box-shaped cross-section. Figs. 19 and 21 illustrate the manner in which the forward door column 165 connects with the inner walls of the upper cowl 103, and is formed with an opening 167 through which the door hardware (not shown) may be connected in any convenient manner. The rearward door column 166, illustrated in detail in Figs. 20 and 22 is closed on all sides at its lower portion but becomes an open trough-like cross-section at its upper end. If desired, the column 166 may be formed with an integral depression 169 which is suitable for the mounting of a direction indicating device or the like (not shown).

The double sill members 116' and 116" may be extended forwardly to integrally join the longitudinal panel and interconnecting wall members 127 and 129, while at the rear the side wall portions 113' and 113" are formed with integral extensions 133' and 133" respectively, thus forming a pair of longitudinal supporting beams extending from one end of the vehicle to the other. These beams on opposite sides of the vehicle are interconnected by suitable transverse beams. In the front part of the vehicle the connecting transverse walls are formed by the forward wall 126, the intermediate walls 163' and 163" and the transverse walls 125 and 125'. In the rear the transverse walls 152, 153 and 134' integrally interconnect the inner longitudinal beams on opposite sides of the vehicle, while the transverse wall 134" interconnects the outer longitudinal beams.

The longitudinal beams described above are preferably stiffened by suitable cross ribs 170, as shown, for example, in Figs. 13, 16 and 17. At the point of intersection of the cross ribs 170 may be formed a core provided with an eye 171 for receiving screws or bolts to attach the body to the chassis (not shown).

Further strengthening is provided as illustrated in Fig. 17 by interconnecting the fender 132 between the lower edge of the cowl side wall 117 with the inner wheel housing panel 127, and the rear by interconnecting the extensions 133" and 133' by the attached fender 132'.

While not illustrated, it is obvious that suitable metallic reinforcement as described in connection with Figs. 10 and 11 could, without invention, be applied to the vehicle body illustrated in Figs. 12 to 22, inclusive.

Figs. 23 and 24 illustrate the modified type of vehicle rear construction adapted to be used in a vehicle body such as illustrated in Figs. 12 to 22, inclusive, but which obviously is not limited to use with such a body alone. It will here again be seen that the vehicle body of artificial material is formed with integral roof 201, windshield frame 202, side walls 213 and rear walls 250. The forward body construction is, however, entirely of no importance with respect to the present invention. In the instant arrangement it is proposed to form louvers between the transverse walls 252 and 253 interconnecting the opposite side walls and the rear wall 250. The transverse walls 252 and 253 direct the cooling air stream to an air cooled driving motor 255 located in the rear engine space 254. The louvers 251 lead into canals 256 which in turn lead into the engine space 254, and are separated from one another by means of wall 257 interconnecting the transverse walls 252 and 253; the latter in turn closes the canals from the vehicle interior. The engine space is preferably closed by suitable means shown here as a lid 258.

It will be obvious that the above-described arrangement of louvers and cooling passages can be simply formed on a press by means of vertically acting upper and lower dies simultaneously with the formation of the remaining body parts.

It will also be obvious that the principles of this louver construction may be applied to a body in which the engine is located in the front under a hood, as well as in the rear as shown in the instant case. The louvers may also be used to provide ventilation of the interior of the vehicle as well as for or instead of cooling the engine.

Many modifications all coming within the scope of the principles of the present invention will be apparent to those skilled in this art. Among those contemplated is the possibility of forming the vehicle body with a roof opening instead of the closed roof illustrated. Such a roof opening can be formed by vertically acting dies simultaneously with the formation of the vehicle body as a whole.

The invention has been described as applicable to a vehicle having an engine mounted in the rear, with the baggage compartment in the front. The invention, however, is clearly applicable to a vehicle in which the engine is adapted to be forwardly mounted.

The type of artificial material used is wholly without importance. It is contemplated that the material may have a phenol, urea, cellulose or polyvinol basis and may be laminated or unlaminated.

In all cases, with the few slight exceptions previously discussed, the basis of this invention lies in the formation of all the described vehicle body parts upon a simple vertically acting press. However, while I have herein shown and described only certain embodiments of certain features of the present invention, it is to be understood that they are to be regarded merely as illustrative and that they are not limited thereto except as may be required by the following claims.

I claim:

1. A vehicle body having a roof, windshield frame and cowl formed as an integral piece of artificial material, said cowl having side walls extending forwardly, and a forwardly downwardly extending transverse wall formed integrally with said cowl, and wheel housing panels formed integrally on each side of said transverse wall and extending upwardly inside said side walls of said cowl and integrally interconnected therewith at the top of said side walls to form a double-wall having a V-shaped cross-section.

2. The combination according to claim 1, in which the bottom of said wheel housing panels are vertically spaced from said transverse wall, in combination with obliquely vertical longitudinally extending wall members integrally connecting said transverse wall with the bottoms of said wheel panels and forming with said wheel panels a double-wall having a substantially V-shaped cross-section.

3. The combination according to claim 1, in combination with side walls for said vehicle, integrally formed of artificial material with said roof.

4. The combination according to claim 1, in combination with wheel fenders rigidly interconnecting the bottom of said side walls with said wheel-housing panels.

5. The combination according to claim 1, in which the bottoms of said wheel-housing panels are vertically spaced from said transverse walls, in combination with obliquely vertical, longitudinally extending wall members integrally connecting said transverse wall with the bottoms of said wheel panels and forming with said wheel-housing panels a double-wall having a substantially V-shaped cross-section, and spaced vertical transverse ribs interconnecting said wheel housing panels and said vertical wall members.

6. The combination according to claim 1, in which the bottoms of said wheel-housing panels are vertically spaced from said transverse wall, in combination with obliquely vertical longitudinally, extending wall members integrally connecting said transverse wall with the bottoms of said wheel-housing panels and forming with said wheel-housing panels a double wall having a substantially V-shaped cross-section, and cross ribs interconnecting said wall members and said wheel panels, having a core at their point of intersection adapted to form a connecting and supporting point for said vehicle body.

7. A vehicle body having a roof, windshield frame, cowl and side walls formed as an integral molded piece of artificial resinous material, said side wall being forked to form a depending double-wall, open at the bottom and having a cut-out portion forming a door opening, said double-wall extending forwardly beneath said door opening to form a hollow longitudinally extending beam for said body.

8. A vehicle body having a roof, and rear and side walls formed as an integral piece of artificial resinous material, said side wall being forked to form a depending integral double-wall open at the bottom, the inner portion of said double-wall being inwardly displaced and relatively longer than the outer portion at the rear of said body to form a depending wheel-housing panel at this point.

9. The combination according to claim 8, in combination with a fender interconnected between the bottom of the outer double-wall portion and said wheel-housing panel.

10. The combination according to claim 8, wherein said side wall forward of said wheel-housing is formed with a cut-out portion providing a window opening for said body transversely displaced from said wheel-housing at least the thickness of one of the double-wall portions, and said forked double-wall construction begins at the lower edge of said window opening.

11. The combination according to claim 8, in combination with an integral double-wall interconnecting the wheel-housing panels on opposite sides of the vehicle.

12. The combination according to claim 8, in combination with a transverse double-wall, one portion of which is integrally interconnected with said wheel housing panel and the other portion of which is rigidly interconnected with the outer portion of said double side wall.

13. The combination according to claim 8, in combination with a second integral double-wall interconnecting the wheel-housing panels on opposite sides of the vehicle, one of said double-walls having an opening at its lower end, in combination with longitudinally extending ribs connected across said second double-wall to form a plurality of substantially vertical passages open at the top of the vehicle and communicating with said opening at their other end.

14. A vehicle body having a roof, windshield frame, cowl and side wall formed as an integral molded piece of artificial resinous material, said side wall having a cut-out portion forming a door opening and said cowl having depending side members having a hollow box-shaped cross-section, open at the bottom and forming a forward post for said door opening.

15. A vehicle body having a roof, and rear and side walls formed as an integral piece of artificial material, a pair of spaced transverse walls integrally interconnecting said side walls, one of said transverse walls being closed to the interior of the body, said transverse walls forming between them a substantially vertical canal open at the top and a plurality of longitudinally extending ribs interconnecting said transverse walls to provide a plurality of vertical passages communicating with the outside air.

16. A vehicle body having a roof, windshield frame, cowl and side wall formed as an integral molded piece of artificial resinous material, said side wall having a cut-out portion forming a door opening and being forked to form a double wall, open at the bottom, and integral transverse walls of artificial resinous material cooperating with said double wall to form a rear post, open at the bottom for said door opening.

17. A vehicle body having a roof, windshield frame and cowl formed as an integral piece of artificial material, said cowl having an integral extension forming a transverse wall, said transverse wall extending downwardly of the main body portion, at its lower end having a transverse horizontal extension adapted to form a supporting surface for said body, continuing upwardly and forwardly from said horizontal portion, then extending forwardly horizontally with an opening in said horizontal portion, and then forwardly and downwardly to the front end of the vehicle, in combination with oblique vertical side members integral with said cowl and transverse wall, extending forwardly to the end of the vehicle and forming with said transverse wall a closed space open at the top and bottom.

18. A vehicle body having a roof and side walls formed as an integral molded piece of artificial resinous material, said side walls being forked to form a double depending wall, open at the bottom, in combination with integral transverse strengthening ribs of artificial resinous material interconnecting the opposite sides of each double wall.

ERWIN KOMENDA.